(12) United States Patent
Linder

(10) Patent No.: US 12,463,392 B2
(45) Date of Patent: Nov. 4, 2025

(54) TORQUE HINGE, DEVICE HAVING A TORQUE HINGE, AND USE OF A TORQUE HINGE

(71) Applicant: Systec & Solutions GmbH, Karlsruhe (DE)

(72) Inventor: Philipp Linder, Karlsruhe (DE)

(73) Assignee: Systec & Solutions GmbH, Karlsruhe (DE)

( * ) Notice: Subject to any disclaimer, the term of this patent is extended or adjusted under 35 U.S.C. 154(b) by 369 days.

(21) Appl. No.: 18/016,091

(22) PCT Filed: Jul. 14, 2021

(86) PCT No.: PCT/EP2021/069560
§ 371 (c)(1),
(2) Date: Jan. 13, 2023

(87) PCT Pub. No.: WO2022/013271
PCT Pub. Date: Jan. 20, 2022

(65) Prior Publication Data
US 2023/0275381 A1    Aug. 31, 2023

(30) Foreign Application Priority Data
Jul. 17, 2020   (EP) ..................................... 20000257

(51) Int. Cl.
*H01R 35/04*       (2006.01)
*E05D 3/02*        (2006.01)
(Continued)

(52) U.S. Cl.
CPC .............. *H01R 35/04* (2013.01); *F16C 11/04* (2013.01); *G06F 1/1654* (2013.01);
(Continued)

(58) Field of Classification Search
CPC .... H01R 35/04; H01R 13/6205; H01R 31/06; F16C 11/04; G06F 1/1654; G06F 1/1681;
(Continued)

(56) References Cited

U.S. PATENT DOCUMENTS 5,394,297  A  *  2/1995  Toedter .................. G06F 1/1681
                                                      174/136
5,498,165  A  *  3/1996  Tseng .................... G06F 1/1654
                                                      439/31
(Continued)

FOREIGN PATENT DOCUMENTS

EP           2891029 B1       11/2017

*Primary Examiner* — Edwin A. Leon
(74) *Attorney, Agent, or Firm* — Smartpat PLC

(57) ABSTRACT

A torque hinge for pivotally connecting two objects has an inner cable guide that provides electrical connection of the objects. The inner cable guide has at the interface a reversibly connectable electrical connector element pair. The torque hinge has a hollow-pin element, a friction element and a first and second bush element. The hollow-pin element is arranged in the first bush element at one end and extends into the second bush element at the other end. The friction element is arranged between the first and second bush elements. The hollow-pin element is connected at one end to the first bush element for conjoint rotation and is pivotably received in the second bush element at the other end, or the hollow-pin element is formed as a free-running pin that is pivotably received in the first bush element at one end and in the second bush element at the other end.

15 Claims, 10 Drawing Sheets

(51) Int. Cl.

| | |
|---|---|
| *E05D 5/10* | (2006.01) |
| *E05D 11/00* | (2006.01) |
| *E05D 11/08* | (2006.01) |
| *F16C 11/04* | (2006.01) |
| *G06F 1/16* | (2006.01) |
| *H01R 13/62* | (2006.01) |
| *H01R 31/06* | (2006.01) |

(52) U.S. Cl.
CPC ....... *G06F 1/1681* (2013.01); *H01R 13/6205* (2013.01); *H01R 31/06* (2013.01); *E05D 3/02* (2013.01); *E05D 2005/102* (2013.01); *E05D 11/0081* (2013.01); *E05D 11/087* (2013.01); *E05Y 2999/00* (2024.05)

(58) Field of Classification Search
CPC ..... E05D 3/02; E05D 11/0081; E05D 11/087; E05D 2005/102
See application file for complete search history.

(56) References Cited

U.S. PATENT DOCUMENTS

| | | | |
|---|---|---|---|
| 5,751,544 A | 5/1998 | Song | |
| 6,484,016 B1 | 11/2002 | Cheon | |
| 8,753,129 B2 * | 6/2014 | Worley | H01R 35/04 439/31 |
| 9,935,413 B1 * | 4/2018 | Fowle | H01R 35/02 |
| 2008/0076270 A1 | 3/2008 | Jao et al. | |
| 2014/0059805 A1 | 3/2014 | Krahn et al. | |
| 2018/0052497 A1 | 2/2018 | Määttä et al. | |

\* cited by examiner

TORQUE HINGE, DEVICE HAVING A TORQUE HINGE, AND USE OF A TORQUE HINGE

TECHNICAL FIELD

The disclosure relates to a torque hinge, a device comprising two objects connected by a torque hinge, and a use of a torque hinge for pivotally as well as electrically and/or electronically connecting two objects.

BACKGROUND

Torque hinges (also referred to as friction hinges, constant torque hinges, friction hinges, friction torque hinges, positioning hinges) feature mechanical components that allow one object to be moved and positioned at any angular position with respect to another object connected by the torque hinge.

Torque hinges are often found in devices such as laptops, with which the screen is hinged to a base body containing the keyboard, such that the screen is held in the desired angular position relative to the base body. As such, a torque hinge comprises components for pivoting, positioning and fastening.

In principle, a hinge refers to a joint that can be rotated around an axis and has at least two bushes that are fixed to the respective objects. If necessary, the bushes may also be present on the objects themselves. A torque hinge further has at least one friction element for generating a frictional torque in one of the bushes upon rotation about the axis, which moment must be overcome by the user to pivot the hinged object if the hinged object is to be transferred to a different angular position.

There are different friction elements used in torque hinges to generate the frictional torque. A friction element can, as for example known from EP 2 891 029, consist of a plurality of clamping rings that are pressed onto a first section of the pin and connected to one of the bushes (of the first object). The other section of the pin without clamping rings is placed in the other bush (of the second object). When one object pivots around the pin in relation to the other, a uniform frictional torque is generated between the pin and the clamping rings.

Other examples of friction elements comprise friction disks with a corrugated spring that are braced against a stop on a section of the pin and connected to a bush, or clamp pins that are pressed over a section of the pin and anchored in one of the bushes. Thereby, the torque is generated accordingly by the tension of the corrugated spring or by friction between the inner surface of the clamp pin and the outer surface of the pin, as the case may be.

It is also known to provide an inner cable guide through a torque hinge, for example through a pin designed as a hollow shaft, in order to electrically and electronically connect two objects—for example, a monitor and a keyboard of a laptop—for power supply and data transmission.

For example, U.S. Pat. No. 5,751,544 A discloses a releasable hinge with an inner cable guide for the pivotable and electrical/electronic connection of two objects. Thereby, the hinge has a hinge housing allocated to the first object that is reversibly disconnectable and connectable to tube-shaped sections on the second object. The inner cable guide has connector elements at both ends for electrical/electronic connection to the first and second objects.

From US 2018/0052497 A1, a modular torque hinge is known for the pivotable and electrical/electronic connection of two objects, which has two hinge portion bodies that can be reversibly disconnected and connected at an interface, each of which is allocated to an object. An inner cable guide has reversibly disconnectable and connectable electrical/electronic connector elements at the interface of the hinge portion bodies. To allow the objects connected in the use arrangement by the modular hinge to pivot, the modular hinge is designed as a multi joint hinge, wherein each hinge portion body is pivotally hinged to the allocated object via a hollow-pin element. Thereby, electrical/electronic lines extend through each hollow-pin element from the respective object to the connector elements at the interface of the respective hinge portion body, which are rigidly connected to one another at the interface.

SUMMARY

It is an object of the present disclosure to provide a torque hinge with inner cable guide that can be easily closed and disconnected and is thus particularly easy to maintain. Thereby, the torque hinge is to show improved dust and water resistance.

The object is achieved by a torque hinge as disclosed herein.

A further object of providing a disconnection of two pivotally and electrically and/or electronically interconnected objects via the torque hinge is achieved by the device as disclosed herein and the use of a torque hinge as disclosed herein.

A first embodiment of a torque hinge, designed for pivotally connecting a first object to a second object, relates to a torque hinge having an inner cable guide that provides electrical and/or electronic—i.e., electrical or electronic or electrical and electronic—connectivity to the objects in a use arrangement of the torque hinge in which the objects are connected via the torque hinge.

For the purposes of the invention, objects that can be connected to a torque hinge are understood to be any type of articles and devices that have at least one connectable electrical and/or electronic component. As such, the objects comprise not only hardware articles from information technology, such as monitors, keyboards, tablets, etc., but also, for example, tool articles such as lamps, the electrical component of which is designed to supply power to a light source, or support articles such as support arms, which have at least one electrical and/or electronic line or cable, as the case may be, as the electrical and/or electronic component.

The torque hinge has two or optionally more component groups that are reversibly disconnectable and connectable at an interface, of which a first component group is allocated to the first object and a second component group is allocated to the second object in the use arrangement. Thereby, the inner cable guide has at least one reversibly disconnectable and connectable electrical and/or electronic connector element pair at the interface, comprising a first connector element allocated to the first component group and a corresponding/complementary second connector element allocated to the second component group, such that the inner cable guide is divided into two cable guide sections in accordance with the component groups. The torque hinge thereby advantageously permits a simple disconnection of the objects hinged in the use arrangement and also permits again an advantageously simple connection for transfer to the use arrangement. Furthermore, the torque hinge enables the mechanical self-locking and stepless adjustability of the objects relative to one another.

This also significantly simplifies the removal of an object hinged in the use arrangement, for example for replacing the removed object or for mobile use of the removed object (for example, if it is a tablet).

Thereby, the term "inner cable guide" comprises all cables and lines that extend through the torque hinge for electrical/electronic connection of the objects. This can be a cable comprising one or more individual electrical and/or electronic lines or, if necessary, two or more cables that can be disconnected at the interface in accordance with the component groups. For this purpose, the or each cable guide, as the case may be, is interrupted at the interface between the component groups into two cable guide sections, wherein the cable ends are connected at the interface to the respective corresponding connector elements, such that the connection of the corresponding connector elements establishes the electrical/electronic contact of the cable guide sections, thus providing the inner cable guide.

The torque hinge can have a hollow-pin element, a friction element and at least first and second bush elements, which are designed for connection to the objects. If necessary, a torque hinge can also have more than two bush elements. The hollow-pin element has a first section (longitudinal section), which is arranged in the first bush element, and a second section (longitudinal section), which extends into the second bush element and on which the friction element is arranged in a region between the first and second bush elements. That is, the friction element is arranged on the second section of the hollow-pin element but not within the second bush element, at least not entirely. Thus, the second section of the hollow-pin element can be subdivided into two sections, a middle section region that is adjacent to the first section and on which the friction element is arranged, and an end section region that comprises the end of the hollow-pin element opposite the first section and extends into the second bush element. Here, the "region between the bush elements" also comprises receptacle openings in the sides turned towards one another of the bush elements, which may be provided for some components of different friction elements.

In one variant of the torque hinge, the hollow-pin element is connected to the first bush element at the first section in a rotationally fixed manner, and the second section of the hollow-pin element is pivotally received in the second bush element, such that the friction element enables the mechanical self-locking and stepless adjustability of the torque hinge. In another variant of the torque hinge, the hollow-pin element is designed as a free-running pin, which is pivotally received with the first section in the first bush element and with the second section in the second bush element. In both variants and in particular in the second variant, an axial clamping device—in relation to the hollow-pin element—such as a disk spring or a disk spring assembly is provided on the second section, which ensures a constant axial contact pressure on the friction element.

In both variants, the hollow-pin element has a longitudinally axial passage opening through which the inner cable guide extends as well as through the bush elements.

For this purpose, one embodiment of the torque hinge can comprise a connection device that is designed for electrical and/or electronic connection to the first object, which connection device is arranged in the first bush element and is connected-via a partial section of the inner cable guide—to the first connector element. Accordingly, the torque hinge can have a connection element designed for electrical and/or electronic connection to the second object, which connection element is arranged in the second bush element and—via an additional partial section of the inner cable guide—is connected to the second connector element.

According to a still further embodiment of the device, one of the two corresponding connector elements thereby has, on the end face turned towards the other connector element, a number of contact pins that corresponds at least to the number of individual lines of the cable guide or of the respective cable, as the case may be. The other connector element has an accordingly corresponding number of contact sections on its end face, wherein the contact pins and the contact sections are configured in such a manner that, when the connector elements are connected, an electrical/electronic contact is established between a respective contact pin and contact section. For example, the contact pins may be configured as plug pins and the contact sections may be configured as sockets. Preferably, the contact pins may be designed as spring contact pins, such that the contact sections can simply be realized by conductive surface sections that are contacted by touching the spring-assisted contact pin.

To ensure that the connector elements are always correctly connected with respect to the arrangement of the contact pins/contact sections or the allocated individual lines, as the case may be, the two connector elements may have the same non-circular, preferably non-rotationally symmetrical, cross-section. The correct connection position exists if the contours of both connector elements are aligned with one another.

Alternatively or in addition to a non-rotationally symmetrical cross-section of the connector elements, the connector elements may have magnetic coding for the unambiguous determination of the correct position of the contact pins and contact sections of the respective connector element with respect to one another, so that the individual electrical and/or electronic lines are correctly connected to one another, according to yet another embodiment of the device. Each connector element has at least two permanent magnets with a predetermined arrangement of north and south poles on the turned towards end faces, such that an attractive force between the north and south poles on the respective end faces only occurs if the connector elements are correctly positioned relative to one another. Due to the specific arrangement of the permanent magnets with respect to the contact pins/contact sections on the end faces of the connector elements, the clash of identical poles when the connector elements are positioned incorrectly in relation to one another ensures repulsion, which prevents the incorrect connection of the connector elements.

According to a further alternative or additional embodiment of the device for ensuring the correct assembly of the connector elements, the connector elements may have additional control contact pins or control contact sections, as the case may be, the arrangement of which on the respective end face of the connector elements is predetermined with respect to the contact pins and contact sections allocated to the individual lines, wherein the control contact pins or control contact sections, as the case may be, are connected via allocated control lines to a disconnect device that may comprise, for example, a resistance measuring circuit. The disconnect device is configured to connect the individual lines only when the connector elements are completely and correctly connected, such that voltage is applied to the individual lines or signal lines, as the case may be, only if the correct contact of the control contact pins with the control contact sections—and thus of the contact pins and contact sections—has been established.

To further ensure the correct connection of the connector elements provided by the specific arrangement of control contact pins/control contact sections of additional control lines with respect to the contact pins/contact sections of the signal lines, the additional control contact pins/contact sections may differ in shape, for example diameter, from the shape or diameter, as the case may be, of the contact pins/contact sections of the signal lines. Preferably, however, the first connector element can have shaping elements on the end face and the second connector element can have mating shaping elements on the end face. The mating shaping element is designed with a shape that is complementary to the shaping element, which allows the shaping element and mating shaping element to be joined together appropriately. As such, the dimensions and position of the mating shaping elements on the end face of the second connector element correspond to the dimensions and position of the shaping elements on the end face of the first connector element.

Thereby, on one of the connector elements, each control contact pin can be allocated to a first shaping element and each contact pin can be allocated to a second shaping element that is different from the first shaping element. Accordingly, on the other connector element, each control contact section can be allocated to a first mating shaping element corresponding to the first shaping element, and each contact section can be allocated to a second mating shaping element that is different from the first mating shaping element and corresponds to the second shaping element. The first and second shaping elements (and correspondingly the first and second mating shaping elements) can differ in shape and/or dimensions, for example they can be ring-shaped with different diameters around the respective contact pin or contact section, as the case may be.

A further configuration of the additional control lines as lagging contacts—for example by making the control contact pins shorter than the contact pins—also ensures that voltage is not applied to the signal lines until the control lines, and thus the connector elements, are fully and not just correctly connected to one another.

As an alternative to additional control contact pins and control contact sections, at least one of the two connector elements can have a proximity sensor that is connected to a disconnect device for the individual lines via control lines. For example, a Hall probe can be used as the proximity sensor, or another magnetic, inductive, capacitive or optical proximity sensor can be used. This allows the correct and complete connection of the connector elements to be determined without additional control contact pins/control contact sections. With these variants, it is ensured that voltage is not applied to the signal lines until the connector elements are correctly and completely connected, thus effectively sealing the torque hinge interface and further improving explosion protection.

According to yet another embodiment of the device, the torque hinge can comprise one or more seal(s) allocated to the first or the second component group, at least at the interface between the component groups. Thus, the torque hinge achieves at least dust and water tightness in accordance with IP65. Here, IP stands for the International Protection Code. If necessary, further seals, such as gas-tight seals, can be provided between the bush elements in order to achieve a higher degree of protection, for example IP 69, if required. In this manner, the torque hinge can be easily cleaned, such that it can also be used in clean rooms, in particular in combination with a further design of the torque hinge with a closed stainless steel housing, which can be cleaned easily, quickly and efficiently with almost all common cleaning and disinfecting agents. A gas-tight seal provides improved explosion protection by preventing alcohol vapors from the disinfecting agents from reaching the electrical contact point. The interface is thus sealed as a function of the tightness required for the type of protection sought. The design of the sealing and sealing materials are selected accordingly from the sealing solutions known from the prior art to meet the requirements for dust, water and/or gas tightness and with regard to resistance to cleaning agents and disinfecting agents.

In an additional embodiment of a torque hinge, the interface can be provided between the hollow-pin element and the first bush element, wherein the rotationally fixed connection of the hollow-pin element to the first bush element is designed to be releasable. Thereby, the first component group has at least the first bush element and the first connector element, and the second component group has at least the second bush element, the hollow-pin element, and the friction element and the connector element.

Of course, the component groups may have other components that are necessary or customary, as the case may be, or advantageous for forming the torque hinge and connecting the objects. These include, for example, the connection device for connecting the first object, which is to be allocated to the first component group, and the connection element for connecting the second object, which is to be allocated to the second component group. The allocation of additional, not mentioned components of the torque hinge results from their position in the torque hinge with respect to the defined interface. Only the seal optionally provided at the interface can be optionally allocated to the first or the second component group. Thereby, the allocation of such a seal can depend on the installation constellation, for example, depending on the component on which the recess provided to receive the seal is designed. Consequently, in the embodiment with the interface between the hollow-pin element and the first bush element, a groove provided to receive a seal can be provided either on the hollow-pin element or (preferably) on the first bush element, such that the seal can be allocated accordingly with the first component group if the groove is present on the first bush element and with the second component group if the groove is present on the hollow-pin element. Thereby, the presence of a receptacle recess is not mandatory. Sealing solutions that do not require receptacle recesses are also conceivable. In principle, however, an allocation of the interface seal to one of the component groups is not decisive, because the skilled person understands that such seal virtually defines the interface, since it provides the seal at the interface of the connected component groups.

According to still another embodiment of the torque hinge with the interface between the hollow-pin element and the first bush element, it is provided that the releasable rotationally fixed connection of the hollow-pin element to the first bush element, which has a receptacle for the first section of the hollow-pin element, is provided by a positive-locking and/or force-fitting and/or magnetic connection technology.

For a releasable positive-locking shaft-hub connection, the first section of the hollow-pin element can have a non-circular cross-section and the receptacle for the first section of the hollow-pin element in the first bush element can have a correspondingly shaped non-circular cross-section. Particularly preferably, the non-circular cross-section can also be non-rotationally symmetrical in order to ensure a correct connection position of the two component groups when the torque hinge is transferred to the position of use.

For example, the cross-section can be round with a flattening or bulge on one side, or can be shaped as an irregular polygon.

Alternatively or additionally, the first section of the hollow-pin element and the first bush element may have threaded or unthreaded bores in alignment with one another, in which a bolt is correspondingly arranged threaded or unthreaded, wherein screw connections are both positive-locking and force-fitting.

An additional alternative or additional releasable positive-locking and force-fitting connection technology can provide that the first section of the hollow-pin element has a detent recess, such as a notch or groove, for engaging a spring-mounted bolt (for example, a spring pin), which is mounted in a position corresponding to the detent recess in the receptacle of the first bush element designed for the first section.

Alternatively, or in addition to the positive-locking and/or force-fitting connection technologies, a magnetic connection technology can be provided for releasably connecting the hollow-pin element to the first bush element, wherein a first magnetic element is arranged on a surface of the stop adjacent to the first section (perpendicular to the longitudinal axis) and a second magnetic element is arranged on a corresponding surface on the first bush element adjacent to the receptacle. The first and second magnetic elements are selected and arranged from magnetic and magnetizable materials such that an attractive force is provided between the first and second magnetic elements. That is, magnets may be embedded in the surfaces in such a manner that a north pole of a first magnetic element is opposite a south pole of the second magnetic element. Alternatively, it is also possible that only one magnetic element is present, which is formed by an embedded magnet or a magnetic material, while the second magnetic element is provided by a magnetizable insert or material, such that the orientation of the magnet or magnetic material embedded as the first magnetic element does not play a role.

In an additional embodiment of the torque hinge with the interface between the hollow-pin element and the first bush element, a receptacle recess can be designed on an end face of the first section of the hollow-pin element for arranging the second connector element—allocated to the second component group with the hollow-pin element. Such receptacle recess is formed by a section of the longitudinal axial passage opening of the hollow-pin element on the end face and corresponds in shape and dimension to the second connector element, such that the latter can be received in a positive-locking manner in the receptacle recess and connected to the cable guide extending through the longitudinal axial passage opening.

Accordingly, the first bush element has a receptacle (recess) for the first connector element corresponding in shape and dimension to the first connector element and positioned opposite the receptacle recess of the second connector element, which is present on the end face of the first section of the hollow-pin element in the receiving section of the first bush element designed for the first section of the hollow-pin element.

In order to arrange the connector elements in a rotationally fixed manner in the receptacle recess, the first and the second connector elements can have a non-circular, optionally also non-rotationally symmetrical cross-section in an additional embodiment of the torque hinge, wherein the receptacle recess in the hollow-pin element for the second connector element and the receptacle recess in the first bush element for the first connector element has a correspondingly shaped non-circular or non-rotationally symmetrical, as the case may be, cross-section. A non-rotationally symmetrical cross-section of the connector elements can provide for the correct connection, as explained above, in particular if the releasable connection of the hollow-pin element to the first bush element is not based on a form fit of the first section and the receptacle with a non-rotationally symmetrical cross-section, which would already provide for a correct connection position.

In accordance with one embodiment, which is an alternative to the embodiment of the torque hinge present with the interface between the hollow-pin element and the first bush element, the interface is present between the first bush element and the connection device provided for connecting the first object to the first bush element. In this embodiment, such connection device is designed as an adapter that is releasably arranged in the first bush element in an adapter recess that corresponds in shape and dimension to the connection device and can be designed in a connection surface of the first bush element that is provided to abut the first object. In this embodiment, the first component group has the connection device and the first connector element, which is received in a connection bush of the connection device. Accordingly, the second component group of this embodiment has at least the second bush element, the hollow-pin element, the friction element along with the first bush element and the second connector element arranged in a receptacle designed in the first bush element that corresponds in shape and dimension to the second connector element and is positioned at the adapter recess opposite the connection bush of the connection device.

Of course, the second component group in particular may have other components that are necessary or customary, as the case may be, or advantageous for forming the torque hinge and for connection, such as the connection element for connecting the second object. Here as well, the seal optionally provided at the interface can be optionally allocated to the first or the second component group, possibly depending on the position of a groove receiving the seal on the connection device or the adapter recess.

A non-circular shape of the adapter connection device and its alignment with respect to the object connected in the use arrangement is sufficient for a correct connection position of the two component groups, in particular if the connection surface is not flat.

Furthermore, the invention relates to a device that consists of two objects and at least one torque hinge via which the objects are pivotally connected. Thereby, an inner cable guide routed through the torque hinge ensures electrical and/or electronic connection of the objects. Thereby, the torque hinge is a torque hinge according to one of the above embodiments, which enables the reversible disconnecting and connecting of the objects.

A use of a torque hinge with an inner cable guide provides a pivotable and electrical and/or electronic connection of two objects, wherein the reversible disconnecting and connecting of the objects at an interface is enabled by the torque hinge divided into component groups by allocating a first component group to the first object and a second component group to the second object. Thereby, the component groups are mechanically connected to the respective object and provide an electrical/electronic connection of the respective object to the inner cable guide. The reversible disconnecting and connecting of the component groups comprises reversibly disconnecting and connecting at least one pair of electrical and/or electronic connector elements of the inner cable guide at the interface, which consists of a first connector element allocated to the first component group and a corresponding/complementary second connector element allocated to the second component group.

Other embodiments, along with some of the advantages associated with these and other embodiments, will become clear and more readily understood from the following detailed description with reference to the accompanying figures. Objects or parts thereof that are substantially the same or similar may have the same reference signs. The figures are merely schematic illustrations of embodiments of the invention.

DETAILED DESCRIPTION

Figure 1A:
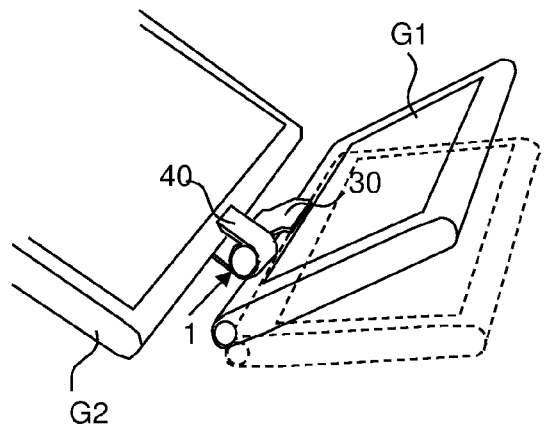
FIG. 1 a is a perspective view of two objects pivotally connected to a torque hinge in a use arrangement.
FIG. 1B is a perspective view of two objects disconnected by disconnection of the component groups.

The invention relates to a torque hinge with inner cable guide, which can be easily joined or connected and disconnected, as the case may be, and is thus particularly easy to maintain, for example for replacing the hinged objects. Another aspect of the invention relates to a device that consists of two objects connected by such a torque hinge, and to the use of the torque hinge for releasably connecting the objects.

As shown by example in FIGS. 1, 2, 3 and 8, the objects G1, G2 connected by a torque hinge 1 may be electronic devices such as a tablet or keyboard G1 and a monitor G2. However, the invention is not limited to these exemplary objects—a torque hinge 1 can be used to connect any object that is to be adjustably pivotable and requires an electrical and/or electronic connection. Thereby, for example, a holder or a support arm, as the case may be, that has an electrical and/or electronic line can also represent an object that can be connected to an electronic device such as a keyboard or a tablet via a torque hinge 1 in a pivotable manner and electrically/electronically, such that the electronic device can be ergonomically adjusted to the respective user. Furthermore, an arrangement comprising a support arm having an electrical line (first object) and an electrical device such as a lamp (second object) is also regarded as a device if the lamp is pivotable via a torque hinge and is electrically connected to the support arm or to the line, as the case may be.

The torque hinges 1 shown have two or three bush elements 30, 40 for connection to the objects G1, G2, which are to be pivotably and electrically/electronically connected. The bush elements 30, 40 are pivotally connected to one another via a hollow-pin element 10, which allows the cable to pass through (see FIGS. 4 to 10). In the devices shown with FIGS. 4 to 7, the hollow-pin element 10 is connected in a rotationally fixed manner at a first section 11 to one of the bush elements 30, wherein, at a second section 12 of the hollow-pin element 10, which rotatably extends into the second bush element 40, a friction element 20 is arranged in the region between the bush elements 30, 40. The friction element 20 provides mechanical self-locking and stepless adjustability in a desired angular position of the objects G1, G2. The friction element 20 in the device shown in FIGS. 4 and 5 has an arrangement comprising a friction ring 21 and a disk 23 arranged between two seals 22. Thereby, the friction ring 21 is anchored in the receptacle opening 44 of the second bush element 40 and is arranged on the second section 12 of the hollow-pin element 10 such that, upon rotation, a frictional torque is generated between the inner surface of the friction ring 21 and the outer surface of the hollow-pin element 10. The arrangement of the disk 23 improves the sealing between the bush elements 30, 40 by arranging the two seals 22, one of which is arranged on the second bush element 40 in a ring-shaped groove 43 and the other on the disk-shaped stop 13 of the hollow-pin element 10 between the sections 11 and 12.

A torque hinge can also have another friction element not shown figuratively herein, which can be a friction element known in the prior art.

Figure 3:
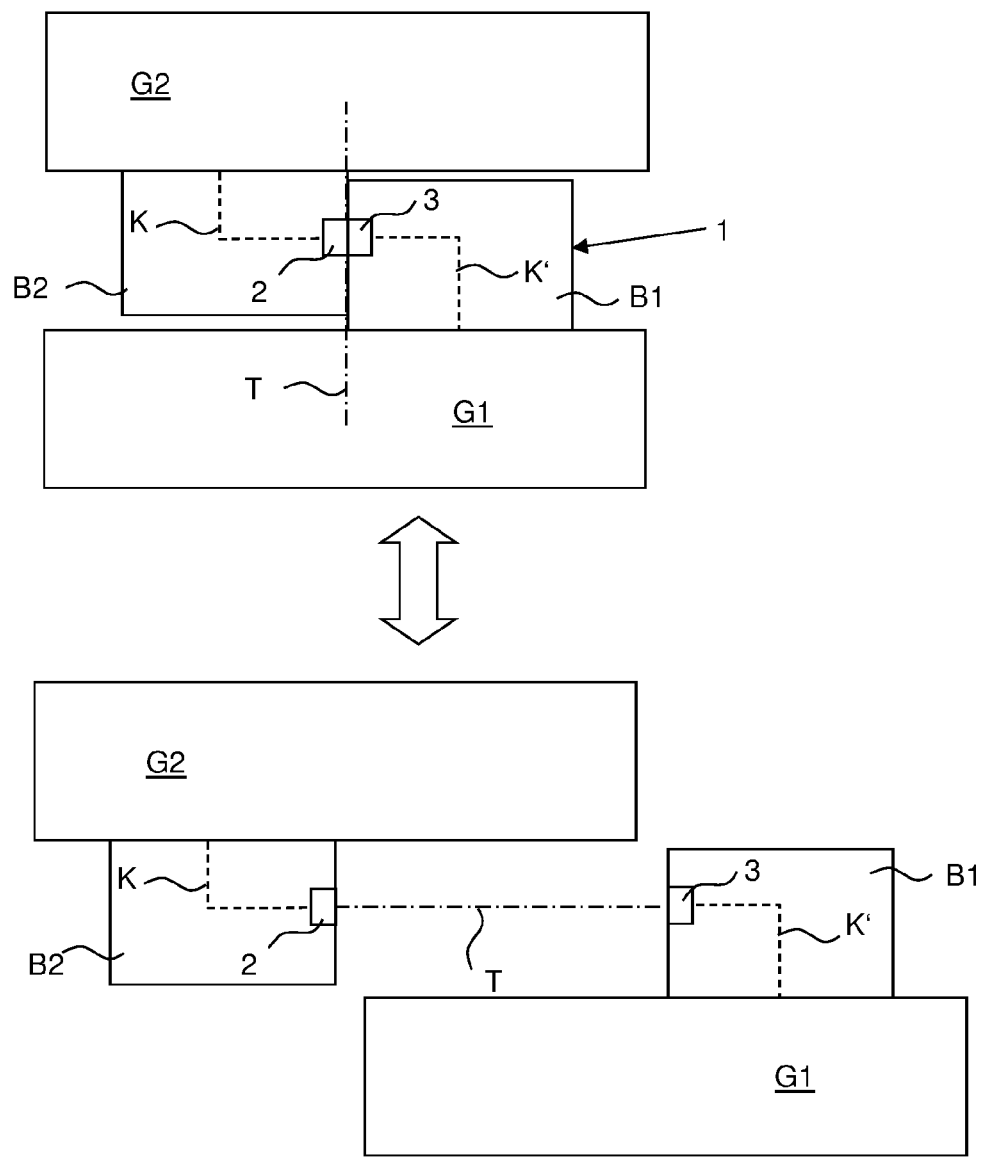
FIG. 3 is a schematic illustration of a device of two objects connected with a torque hinge in a use arrangement and a disconnected arrangement.

In order to enable the simple connection and disconnection of the torque hinge 1 with an inner cable guide, the torque hinge 1, as schematically sketched in FIG. 3, comprises two component groups B1, B2 that can be reversibly disconnected and connected at an interface T and that are allocated to the objects G1, G2, wherein each component group B1, B2 has at least one electrical/electronic connector element 2, 3 at the interface T in each case. The two connector elements 2, 3 are complementary in configuration in order to form a releasable connection in the use arrangement shown in FIG. 3 above if the two component groups B1, B2 are joined together to establish the electrical/electronic contact of the cable guide sections K, K' to provide the inner cable guide. The connector elements 2, 3 can be suitably aligned and releasably fastened by their shaping, as can be seen for example in FIG. 4. For matching alignment, the connector elements 2, 3 have a cross-section that deviates from the circular shape, which is based here on a circular shape that has a bulge on one side.

Figure 12A:
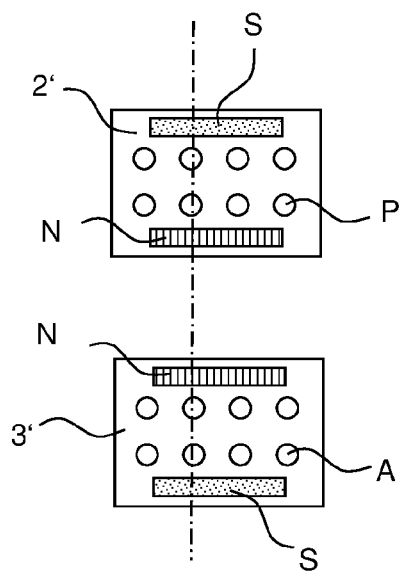
FIG. 12a is a schematic illustration of a magnet coding of the connector elements in top view of the end faces.
Figure 12B:
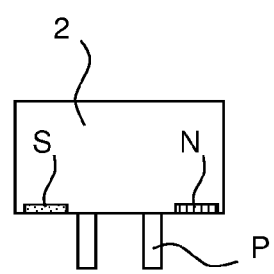
FIG. 12b is a schematic illustration of a magnet coding of the connector elements in side view.
Figure 12B:
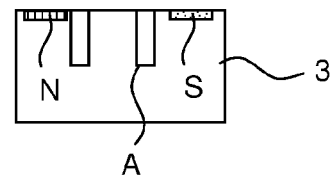
Figure 13:
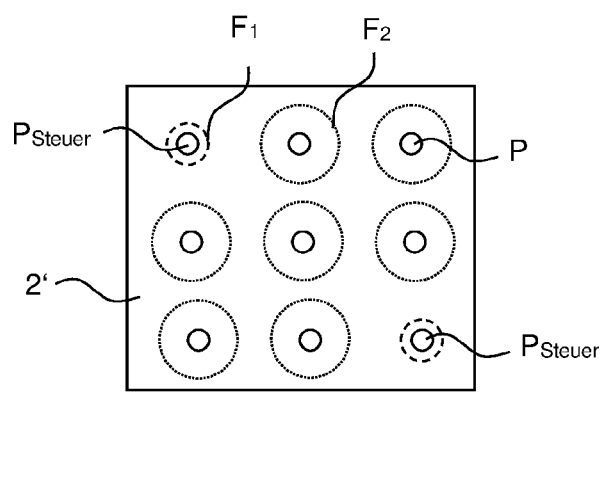
FIG. 13 is a schematic illustration of the arrangement of control and signal contact pins or sections, as the case may be, of a pair of connector elements.
Figure 13:
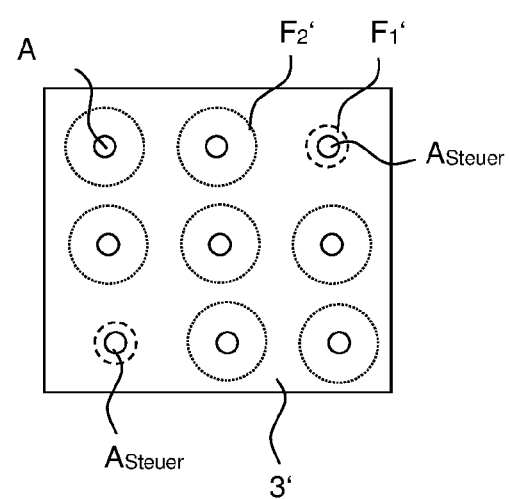

Alternatively (or in addition) to a special shaping of the connector elements 2, 3, the correct position of the connector elements 2, 3 when joining together the torque hinge 1 can be ensured by designs of the connector elements 2, 3 with a magnetic coding or a specific arrangement of additional control contacts, which are respectively outlined in FIGS. 12 and 13.

It is not shown in the figures that the cable guide K, K' usually comprises a plurality of individual lines that serve to electrically and/or electronically connect the objects and are also referred to hereinafter as signal lines. The connector elements 2, 3 each have a contact pin P or contact section A, as the case may be, for each individual line on the respective end face 2', 3', such that when joining together the connector elements 2, 3, contact is made between one contact pin P and one contact section A in each case.

In order to avoid the incorrect joining together of the connector elements 2, 3 in the case of a mirror-symmetrical arrangement of the contact pins P and contact sections A, as shown in FIG. 12a, each of the connector elements 2, 3 shown has two permanent magnets S, N. In each case, a permanent magnet S with the south pole and a permanent magnet N with the north pole are arranged on the respective end face 2', 3' in such a manner that the north poles and south poles of the permanent magnets S, N meet when the connector elements 2, 3 are correctly joined together. Thus, the arrangement of the permanent magnets S, N permits the connection of the two connector elements 2, 3 only in the correct position in FIG. 12b, in which there is an attraction between the respective permanent magnets S, N arranged in opposite poles. In addition, the magnetic attraction secures the connection of the connector elements 2, 3. If the same poles meet when the connector elements 2, 3 are incorrectly positioned, the repulsion ensures that the connector elements 2, 3 cannot be connected.

In principle, the contact pins P may be designed as plug pins and the contact sections A may be configured as sockets. Advantageously, the contact pins P may be designed as spring contact pins, such that the contact sections A can be realized by conductive surface sections that are contacted by touching the spring-assisted contact pin.

FIG. 13 illustrates an embodiment of the connector elements 2, 3 with additional control contact pins $P_{Steuer}$ and control contact sections $A_{Steuer}$, whose arrangement with respect to the contact pins P and contact sections A, as the case may be, determines the correct connection position. The control contact pins $P_{Steuer}$ and control contact sections $A_{Steuer}$ are connected via control lines to a disconnect device (not shown), can comprise a resistance measurement. Of the seven contact pins P and contact sections A in each case, for the purpose of clarity, only one is indexed. When the connector elements 2, 3 are correctly joined together, the contact pins P contact the contact sections A and the control pins $P_{Steuer}$ contact the control contact sections $A_{Steuer}$. By contacting the control pins $P_{Steuer}$ with the control contact sections $A_{Steuer}$, the individual lines or signal lines, as the case may be, to the contact pins P or contact sections A, as the case may be, are connected by the disconnect device, such that voltage is only applied to the contacts when the connector elements 2, 3 are correctly connected.

In order to further facilitate the correct joining together of the connector elements 2, 3, shaping elements $F_1$, $F_2$ and corresponding or complementary, as the case may be, mating shaping elements $F_1'$, $F_2'$ can also be provided on the end faces 2', 3' of the connector elements 2, 3, which are provided to abut one another. In FIG. 13, ring-shaped shaping elements $F_1$ with a smaller diameter (dashed) are allocated to the control contact pins P and ring-shaped shaping elements $F_2$ with a larger diameter (dotted) are allocated to the contact pins P, and ring-shaped mating shaping elements $F_1'$ with a smaller diameter (dashed) are allocated to the control contact sections A and ring-shaped mating shaping elements $F_2'$ with a larger diameter (dotted) are allocated to the contact sections A accordingly.

Of course, embodiments of shaping and mating shaping elements that deviate from the embodiments shown are also conceivable, as is an optional embodiment of the control contact pins and control contact sections in a shape (or mating shape, as the case may be) that deviates from a shape of the contact pins and mating shape of the contact sections.

Thereby, the control contact pins $P_{Steuer}$ and control contact sections $A_{Steuer}$ may be designed as lagging contacts with respect to the contact pins P and contact sections A, in order to avoid sparking during merging, in that the individual lines are not connected until the connector elements 2, 3 are fully connected to one another.

Figure 11:
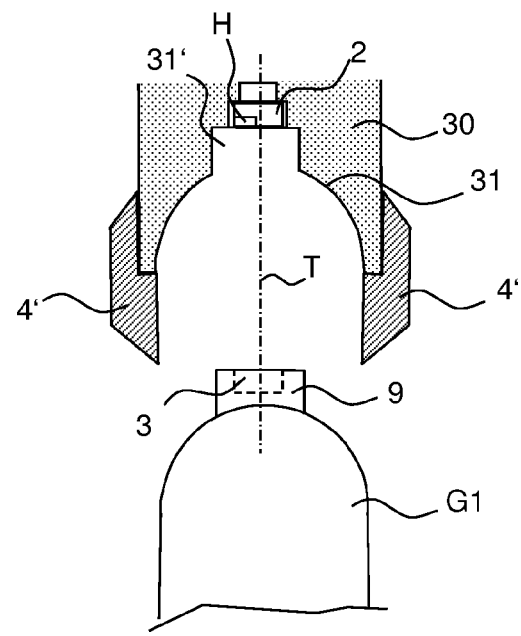
FIG. 11 a schematic front view of the interface of a torque hinge corresponding to FIGS. 7, 8 with an alternative interface seal.

An additional example of ensuring that the connector elements 2, 3 are fully contacted before voltage is applied to the individual lines to prevent sparking comprises a proximity sensor H, which is connected via control lines to a disconnect device for the individual lines (not shown and arranged on one of the connector elements 2, 3. In the example of FIG. 11, a proximity sensor H can be seen on the connector element 2, which is received in the bush element 30. The proximity sensor H detects the approach of the connector element 3, which in this example is received in a connection device 9, such that the individual lines are not disconnected until contact is made. Of course, a proximity sensor can alternatively be arranged in connector element 3.

Figure 1B:
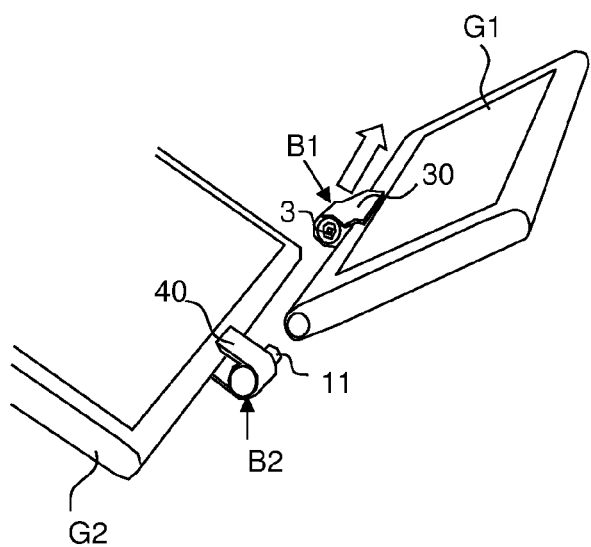

As shown by example in FIG. 1, a torque hinge 1, which provides the electrical and/or electronic connection of the objects G1, G2—here keyboard G1 and monitor G2—with an inner cable guide, provides the pivotable connection in a use arrangement (FIG. 1a), and, by subdivision into reversibly disconnectable and connectable component groups B1, B2, permits the disconnection (FIG. 1b) of the objects G1, G2 at a predetermined interface that is located here between the two bush elements 30, 40 or between the first bush element 30 and the hollow-pin element 10, as the case may be, wherein the hollow-pin element 10, of which the first section 11 can be seen, is allocated to the component group B2 with the second bush element 40. Thereby, the electrical/electronic connection is also disconnected, wherein, of the connector pairing at the interface in FIG. 1b, only the connector element 3 allocated to component group B1 with the first bush element 30 can be seen.

Figure 2A:
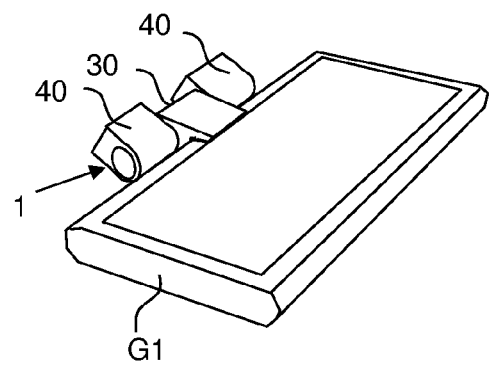
FIG. 2a is perspective view of an alternatively configured torque hinge in a use arrangement with a connected object.
Figure 2B:
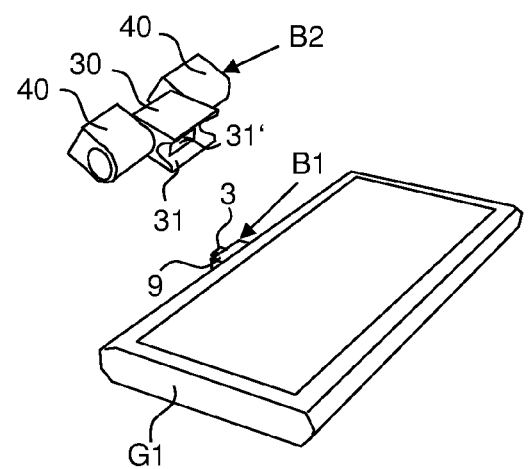
FIG. 2b is a perspective view of an alternatively configured torque hinge disconnected into component groups.

In FIG. 2, an alternative embodiment of a torque hinge 1 is shown, wherein, for reasons of clarity, only one connected object G1 is shown. Here, the torque hinge 1 is configured with a first bush element 30 and two second bush elements 40, each of which is pivotably connected to the first bush element 30 via a pin element, wherein at least one pin element is designed as a hollow-pin element 10, through whose longitudinally axial passage opening the inner cable guide for the electrical/electronic connection of the objects extends. Unlike the example shown in FIG. 1, the interface of the torque hinge 1 of FIG. 2 is not located between the bush elements 30, 40, which are combined here with the hollow-pin element (not shown) in the second component group B2. Here, the first component group B1 has a connection device 9 designed as an adapter, which is designed for electrical and/or electronic connection to the first object G1, and the first connector element 3, which is connected to the connection device 9.

Figure 4:
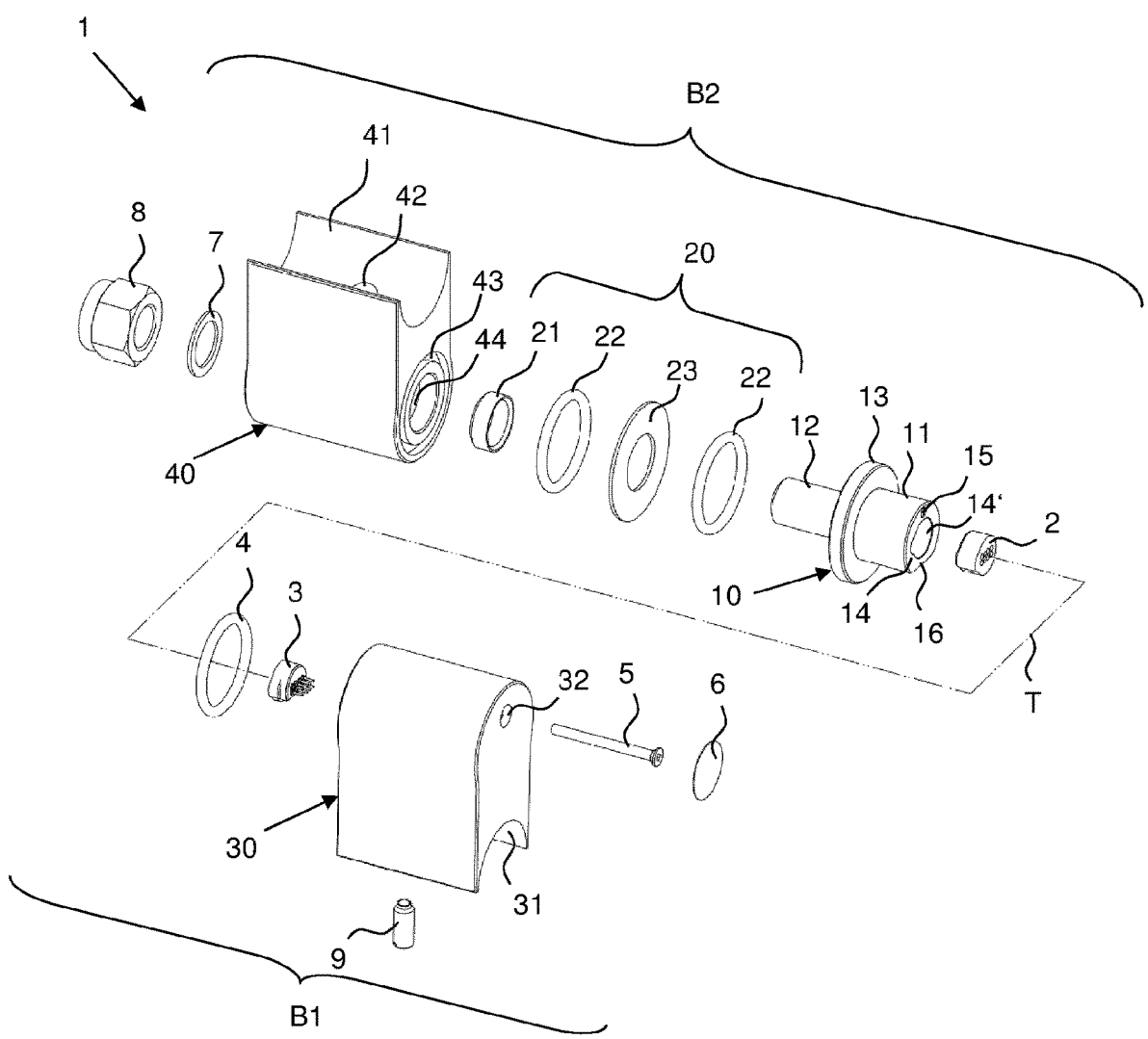
FIG. 4 a perspective exploded view of a torque hinge in accordance with an embodiment of the invention.
Figure 5:
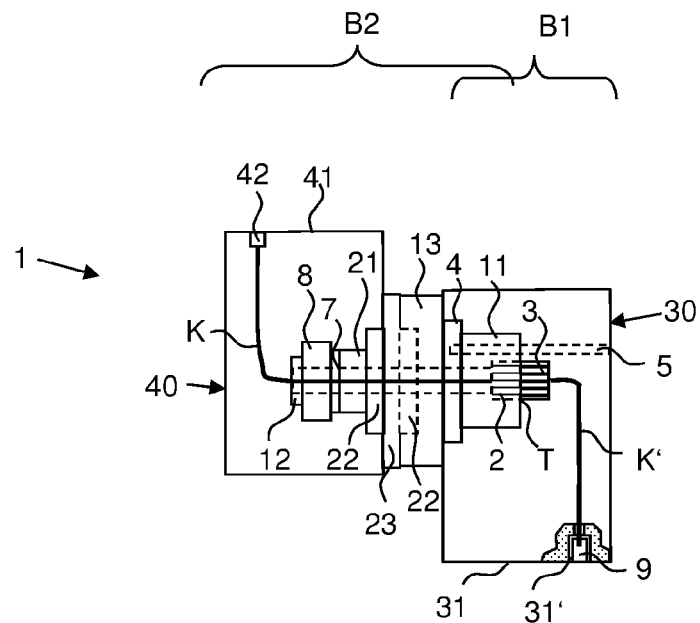
FIG. 5 is a schematic side view of a torque hinge according to FIG. 3.

From FIGS. 4 and 5, the structure of a torque hinge 1, to which FIG. 1 also refers, with an interface T between the hollow-pin element 10 and the first bush element 30 is clear. Thereby, the first component group B1 has the first bush element 30, which is designed with a connection surface 31 for connection to an object that is not shown, a connection device 9, which is designed here as a round plug, and the first connector element 3, which is connected to the connection device 9 via a corresponding section K' of the inner cable guide K, K'. Moreover, the seal 4, which in the use arrangement of the torque hinge 1 seals between the hollow-pin element 10 or the stop 13 designed there, as the case may be, and the first bush element 30, belongs to the first component group B1.

Figure 7A:
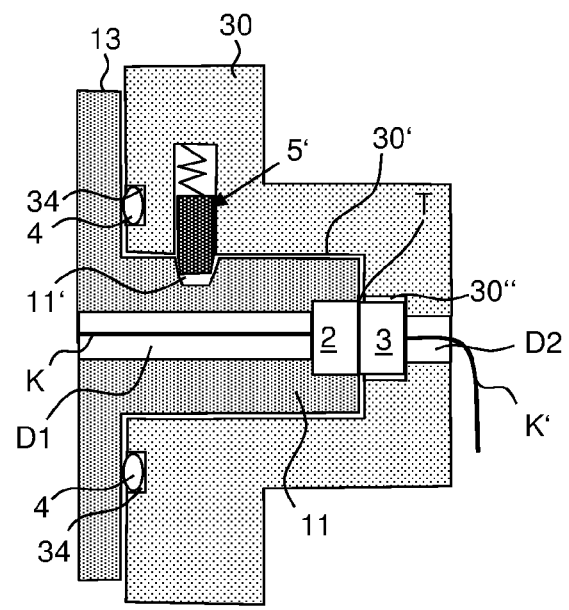
FIG. 7a is a schematic detailed sectional view for the releasable connection of the hollow-pin element to the first bush element by a spring pin engaging in a groove.

The first bush element 30 has corresponding receptacle recesses 30', 30", 31', 34 for receiving the first section 11 of the hollow-pin element 10, the first connector element 3 and the connection device 9 along with the seal 4, as also shown in the schematic illustration in FIG. 7a. The receptacle 30' for the first section 11 of the hollow-pin element 10 is adapted in shape and dimension to the first section 11, which in the illustrated example of FIG. 4 has a cross-section deviating from the circular shape with a flattening 16. Due to this non-rotationally symmetrical cross-section, the two component groups B1, B2 can only be connected in a manner that inherently provides the correct connection position of the connector elements 2 and 3 of the two component groups B1, B2. Sealing between the hollow-pin element 10 and the first bush element 30 is provided by the seal 4, which is arranged in a ring-shaped groove 34, see also FIG. 7a, designed in the first bush element 30 around the receptacle 30'—corresponding to the ring-shaped groove 43 around the receptacle opening 44 in the second bush element 40 in FIG. 4.

Adjacent to the receptacle 30' is a recess 30" for the first connector element 3, which is received in the recess 30" in such a manner that the connector element 3 remains in the recess 30" if it is disconnected from the second connector element 2 when the component groups B1, B2 are disconnected. For this purpose, the recess 30" can be designed to match the shape and dimensions of the first connector element 3, such that there is a form fit, and can have additional fastening means if necessary. Adjacent to the recess 30" is a passage opening D2 for the cable guide section K', which supplements the cable guide section K to the inner cable guide K, K' and extends to the connection device 9, which is arranged in a correspondingly designed receptacle recess 31' at the connection surface 31, at which the first component group B1 is connected to the object that is not shown.

The (threaded) bolt 5, which in the use arrangement of the torque hinge 1 provides for the releasable connection of the bush element 30 to the hollow-pin element 10 by engaging the (threaded) bore 15 in the end face of the first section 11 of the hollow-pin element 10, along with the cover 6, which complements the closed housing surface of the torque hinge 1 for a desired cleanability and tightness against dust and water, are also counted as part of the first component group B1.

The second component group B2 of the torque hinge 1 in FIGS. 4 and 5 comprises, as substantial components, the hollow-pin element 10, the friction element 20, the second bush element 40 and the second connector element 2, which is arranged in a receptacle recess 14' on the hollow-pin element 10. There, the receptacle recess 14' is designed by a section of the passage opening D1 on an end face 14 of the first section 11 (see FIG. 5). The receptacle recess 14' corresponds in shape and dimension to the second connector element 2, which has a non-rotationally symmetrical cross-section deviating from the circular cross-section, such that the second connector element 2 is arranged in the receptacle recess 14' in a rotationally fixed manner. Accordingly, the connector element 3 is also designed with a non-rotationally symmetrical cross-section deviating from the circular cross-section, which necessitates a corresponding shape of the receptacle 30" for the first connector element 3 in the first bush element 30. The receptacle recess 14' and the receptacle 30" are positioned so that they are opposite one another in the use arrangement, such that the connector elements 2, 3 connect when the component groups B1, B2 are joined together.

For a closed housing surface of the second bush element 40 (for closing a mounting opening not visible in FIG. 4 on the side turned away from the receptacle opening 44), a cover that is not shown (corresponding to cover 6' in FIG. 8) can be provided, which is also counted as part of the second component group B2. The friction element 20, consisting of a friction ring 21 and a disk 23 arranged between the two seals 22, is arranged on the second section 12 of the hollow-pin element 10, which extends from the stop 13 in the opposite direction to section 11. The friction ring 21 is fastened, for example press-fitted, in the receptacle opening 44 of the second bush element 40 such that, upon rotation, a frictional torque is generated between the inner surface of the friction ring 21 and the outer surface of the second section 12 of the hollow-pin element 10. In the example of FIGS. 4 and 5, the friction element 20 is axially fixed by means of disk spring 7 and disk spring assembly and screw nut 8, as the case may be, which accordingly also belong to the second component group B2. The disk spring 7 ensures a constant axial contact pressure.

Figure 6:
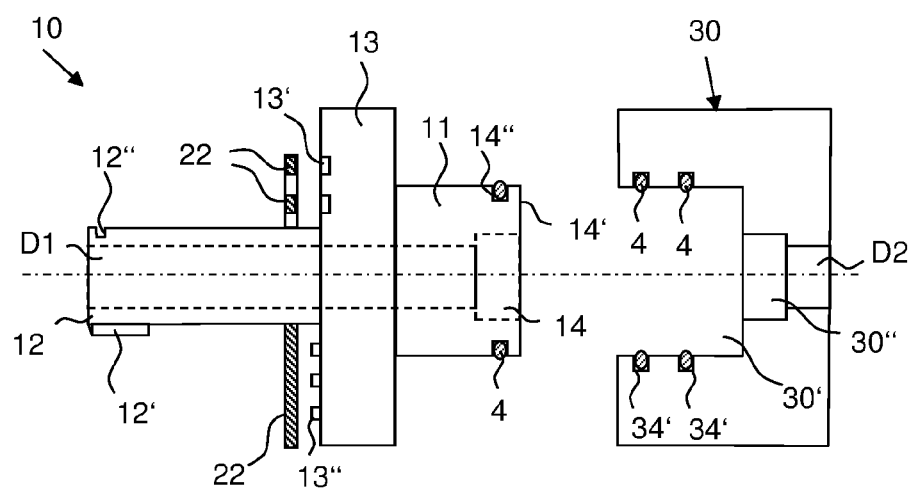
FIG. 6 is a schematic side view of the hollow-pin element with a first bush element of a torque hinge corresponding to FIG. 3 with different connection and sealing solutions.

Examples of alternative axial fastening and sealing options are shown together on a single hollow-pin element 10 in FIG. 6. This combination of fastening and sealing options is not intended to be realized in this manner but is only intended to illustrate different known axial fastening and sealing options in a space-saving figurative manner. Of course, individual options of the exemplary fastening and sealing options shown can be used in the embodiments of the other examples, and the skilled person will also recognize useful combination options of the fastening and sealing options shown. Thus, in the illustration in FIG. 6, different examples are shown above and below the axis of rotation and to the right and left of the stop 13. For the axial fastening to the second section 12, a groove 12" is shown (in the example, below the axis of rotation) as an alternative to the screw connection by means of the thread 12' already mentioned (in the example, above the axis of rotation), which is provided for engagement with a pin (not shown).

For sealing the friction element 20 or the disk 23, as the case may be, against the stop 13 of the hollow-pin element 10, not only a single sealing ring can be used as seal 22 as shown in FIG. 4, but also a multi-stage seal 22 with two concentric sealing rings (in the example of FIG. 6, above the axis of rotation) arranged in receptacle grooves 13' on the end face of the stop 13 adjacent to the section 12 can be used, or more concentric sealing rings with corresponding receptacle grooves can be provided. The example below the plane of symmetry in FIG. 6 shows as the seal 22 a sealing disk pressed against sealing ribs 13" designed in the end face of stop 13 adjacent to section 12.

As an alternative to the arrangement of an interface sealing ring 4 between the end face of the stop 13 adjacent to the section 11 and the first bush element 30 (or, as the case may be, its end face turned towards the stop 13, as shown in FIGS. 4, 5 and 7*a*, FIG. 6 shows a sealing ring 4 for sealing the interface with the bush element 30, shown schematically only in sections, in a circumferential groove 14" on the first section 11 of the hollow-pin element 10. Additionally or alternatively, one or more interface sealing rings 4 (in the example shown, two sealing rings 4) can be arranged in corresponding circumferential grooves 34' in the receptacle recess 30' of the first bush element 30, in order to seal the interface after the first section 11 is inserted into the receptacle recess 30'.

Due to a structural design of a torque hinge with smooth transitions sealed by seals between the individual housing components, that is, all components providing an outer surface of the torque hinge (bush elements 30, 40, disk 23, stop 13, covers 6) and their preferred design made of stainless steel or with a stainless steel surface, as the case may be, the cleaning of a torque hinge, with disinfecting agents as well, is considerably simplified. Of course, the scope of protection is not limited to this particularly preferred and advantageous embodiment of the torque hinge. Rather, the scope of protection also extends to all torque hinges with inner cable guide that do not have smooth transitions between housing components, do not have a closed housing, and do not have covers and are not made of stainless steel, as long as the torque hinge is divided into two reversibly disconnectable component groups in accordance with the claim.

Figure 7B:
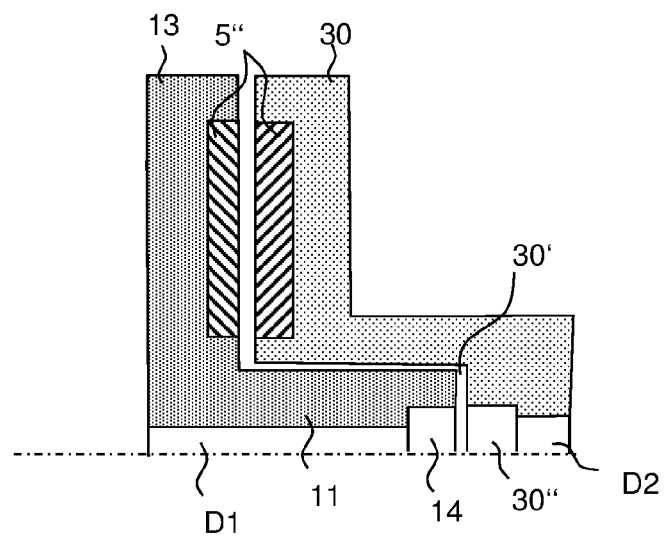
FIG. 7b is schematic detailed sectional view for the releasable connection of the hollow-pin element to the first bush element by a magnetic connection.

FIGS. 7*a* and 7*b* show first bush elements 30 connected to the hollow-pin element 10 using releasable connection technologies, which can be used as an alternative or in addition to the connection technology shown in FIGS. 4 and 5 with a bolt 5 and a bore 15 to releasably connect the component groups to one another when transferred to the use arrangement of the torque hinge 1. In the schematic illustrations of FIGS. 7*a* and 7*b*, however, only the section of the first bush element 30 is shown, which has the receptacle 30' for the first section 11 of the hollow-pin element 10, the receptacle 30" for the first plug element 3 and the passage opening D2 for the cable guide section K', which supplements the cable guide section K through the passage opening D1 in the hollow-pin element 10 when the plug elements 3, 4 are in contact to provide the inner cable guide K, K'.

In FIG. 7*a*, as an example of a releasable connection technology, a spring pin 5' supported in the first bush element 30 is shown for engagement with a groove 11' designed in the first section 11 of the hollow-pin element 10. Since the spring pin 5' automatically engages when the first section 11 is inserted into the receptacle 30', the connection can be made very quickly and easily. To release the latching engagement, a retraction mechanism (not shown) can be provided to retract the spring pin 5' from the groove 11', such that the hollow-pin element 10 with the first section 11 can be disconnected from the first bush element 30. Alternatively, spring pin 5' and the groove 11' can be shaped, for example with a chamfer, such that when sufficient tension is applied to the hollow-pin element 10, the spring pin 5' is pushed out of the groove 11' following the chamfer until the latching engagement is released.

An additional example of a releasable connection technology of the first bush element 30 to the hollow-pin element 10 is shown in FIG. 7*b*, in which substantially the regions of the first bush element 30 and the hollow-pin element 10 above the axis of rotation are shown, showing the pair of magnetic elements 5" selected from magnetic or magnetizable inlets or materials and arranged such that an attractive force exists between the magnetic elements 5'. Thereby, the first magnetic element 5' is arranged on an end face of the stop 13 adjacent to the first section 11, and the second magnetic element 5' is arranged on a corresponding surface on the first bush element 30 adjacent to the receptacle 30'. The shape, number and arrangement of the magnetic elements is not limited, except that the respective pairs of magnetic elements are positioned correspondingly and, if both magnetic elements are made of magnetic material or magnets, as the case may be, face one another with different poles.

Figure 8:
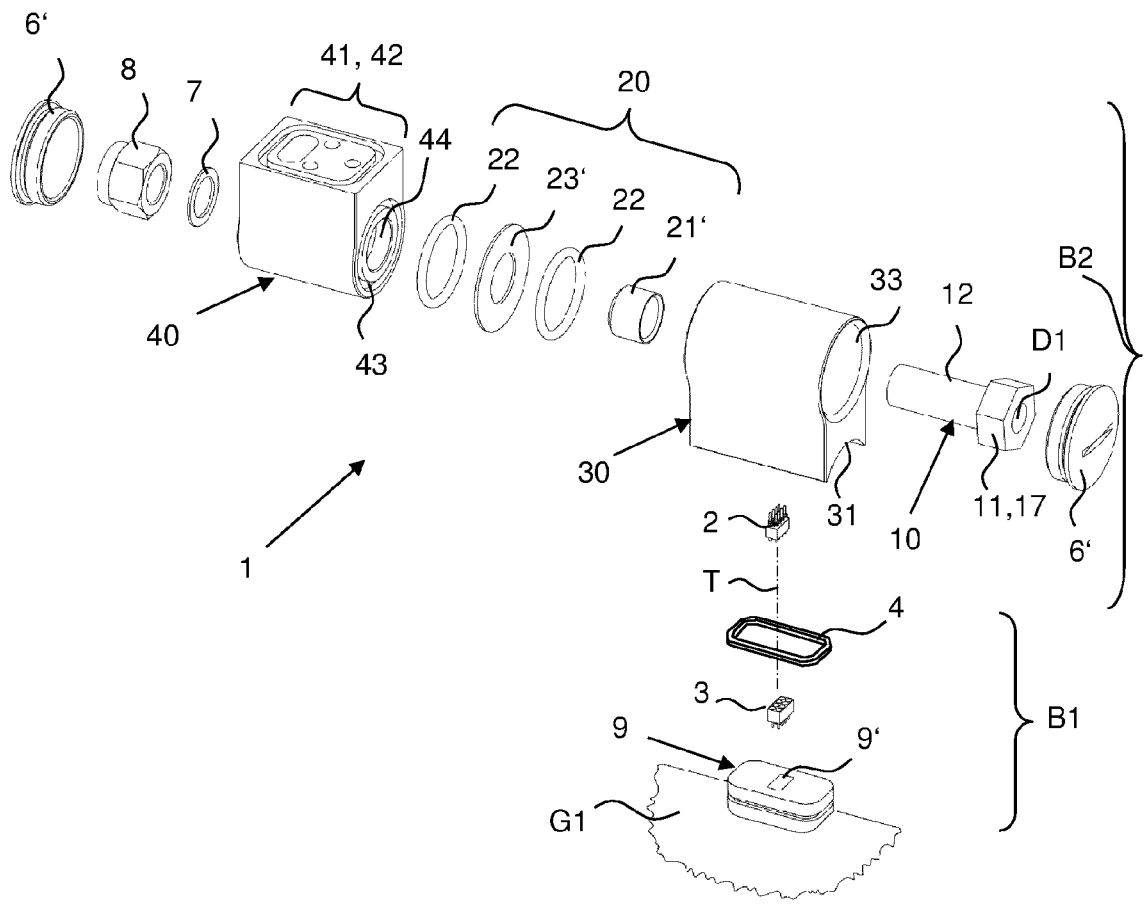
FIG. 8 is a perspective exploded view of a torque hinge in accordance with an embodiment of the invention.
Figure 9:
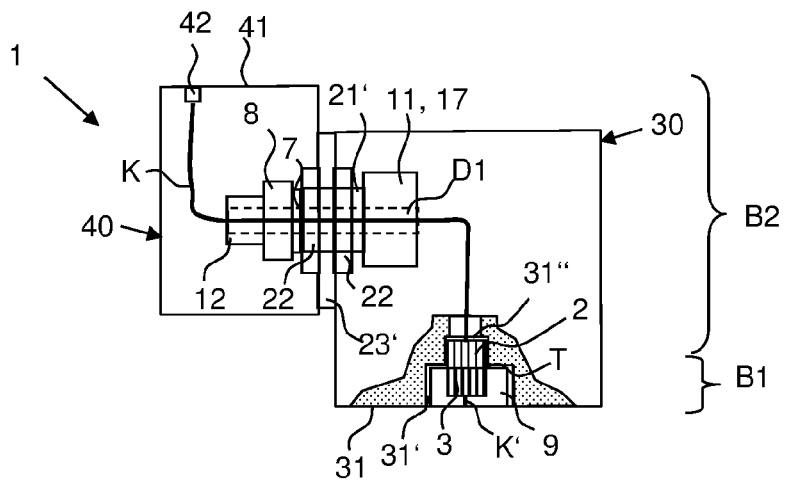
FIG. 9 is a schematic side and partial section view of a torque hinge corresponding to FIG. 7.

From FIGS. 8 and 9, the structure of a torque hinge 1, as indicated in the example of FIG. 2, with an interface T between the first bush element 30 and a connection device 9 configured as an adapter, is clear. Thereby, the first component group B1 allocated to the first object G1 has the connection device 9 configured as an adapter and the first connector element 3 received in a connection bush 9' of the connection device 9 for connection to the cable guide section K'. The connection device 9 is designed to be connected to the object G1, which has an electrical/electronic interface (not shown), by mounting the connection device 9 on the object G1 with the cable guide section K'. In this example, the seal 4 provided for sealing between the component groups B1, B2 at the interface T is allocated to the first component group B1, and is received in a circumferential groove of the connection device 9.

Alternative sealing solutions can also be considered here. Alternatively or in addition to a seal 4 received in a groove designed circumferentially on the connection device 9, one or more circumferential grooves for receiving one or more interface seals 4 may be designed in a recess 31' designed in the first bush element 30 for receiving the connection device 9, comparable to the interface sealing solutions described in connection with FIG. 6. Alternatively, a flat seal (not shown) can be inserted between the connection device 9 and the bush element 30 without a circumferential receptacle groove being provided for it on the connection device 9 or in the recess 31'.

Likewise, it is possible to use an outer molded seal 4' to seal the interface between the first bush element 30 and the connection device 9, allocated to the first object G1, as outlined in FIG. 11. There, it can also be seen that the connection surface 31 of the first bush element 30 is shaped in a manner corresponding to the contour of the first object G1 in the region of the allocated connection device 9.

The connection device 9 in the example illustrated with FIG. 8 has a non-circular shape with the rounded rectangular cross-section and is aligned upon mounting to object G1, such that the second component group B2 can be connected in the correct connection position to the torque hinge 1 for a pivotable and electrical/electronic connection to the object (not shown) allocated to the second component group B2.

In this example, the second component group B2 has the second bush element 40, the hollow-pin element 10, the friction element 20 along with the first bush element 30 and the second connector element 2, which is received here in a receptacle 31" in the first bush element 30, which corresponds in shape and dimension to the second connector element 2. The receptacle 31" for the second connector element 2 extends from an adapter recess 31', which is designed in the first bush element 30 in a connection surface 31 provided to abut the first object G1 for receiving the connection device 9. Thereby, the adapter recess 31' is designed to releasably receive the connection device 9 and corresponds in shape and dimensions to the connection device 9. Thereby, the receptacle 31" for the second connector element 2 is positioned with respect to the adapter recess 31' in such a manner that the receptacle 31" faces the connection bush 9' of the connection device 9 if the connection device 9 is received in the adapter recess 31' for connecting the component groups B1, B2. In this manner, in this embodiment as well, the inner cable guide K, K' connecting the objects through the torque hinge 1 is established by the interconnected connector elements 2, 3, wherein the section K' extends through the first component group B1 complementing the cable guide section K extending through the second component group B2.

Additional components, such as a connection element 42 in the connection surface 41 for connecting the second object, covers 6' for creating a closed housing surface and fastening means for axially fixing the friction element 20, such as disk spring 7 and screw nut 8, accordingly also belong to the second component group B2.

Figure 10:
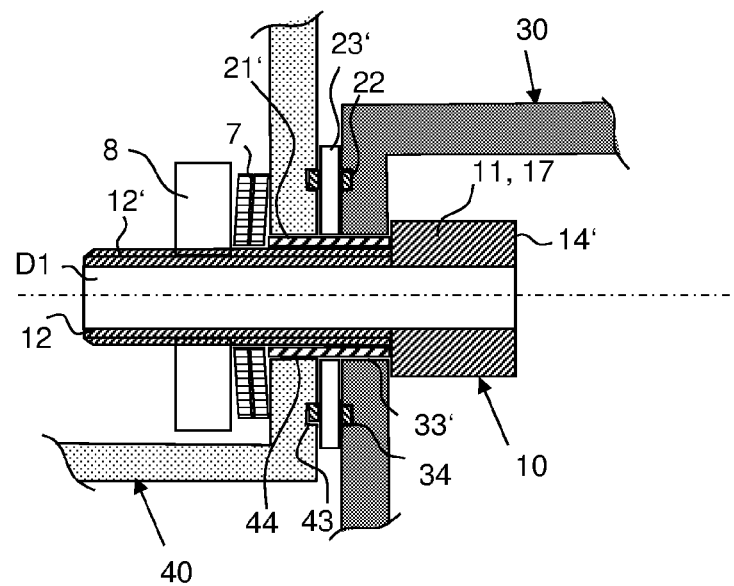
FIG. 10 is a schematic detailed sectional view of the hollow-pin element arrangement of FIGS. 7, 8.

Deviating from the embodiment shown in FIG. 4, the hollow-pin element 10 in the example of FIGS. 8, 9 and 10 does not have a disk-shaped stop and a deviating friction element 20. Here, the hollow-pin element 10 with the longitudinally axial passage opening D1 has a first section 11, which is designed as a head section 17 with a non-circular, here hexagonal cross-section as a screw head. In this embodiment, the head section 17 is not fixed against rotation in the bush element 30; rather, the hollow-pin element 11 is designed as a free-running pin that is pressed on both sides to generate the frictional torque with the friction element 20. Upon mounting, the hollow-pin element 11 inserted through the mounting opening 33 of the first bush element 30 is clamped against the nut 8 by means of retaining engagement on the screw head 17, wherein the disk spring 7 (or the disk spring assembly, as the case may be) provides a constant contact pressure as an axial clamping device, which acts on the friction element 20 that is arranged on the second section 12 of the hollow-pin element 10 in the region between the bush elements 30, 40. In alternative embodiments, the axial fixing can also be provided by a connecting pin engaging in a groove instead of a nut, for example. From the passage opening D1 of the hollow-pin element 10, the guide of the cable section K extends to the second connector element 2 received in the receptacle 31".

In this example illustrated with FIGS. 8, 9 and 10, the friction element 20 arranged on the second section 12 of the hollow-pin element 10 in the region between the bush elements 30, 40 has a bearing ring 21', which here extends into the receptacle openings 33', 44 of the bush elements 30, 40 and receives the friction disk 23' therebetween, which here is preferably made of a PTFE material or a comparable material with which, advantageously, the static friction corresponds to the sliding friction, such that no friction losses occur. Upon rotation, the axial contact pressure provided by the disk spring 7 generates a frictional torque between the friction disk 23 and the adjacent surfaces of the bush elements 30, 40 or the seals 22 arranged therebetween, as the case may be, which are each arranged in a corresponding sealing groove on the respective bush element 30, 40 (ring-shaped groove 43 on the second bush element 40 and ring-shaped groove 34 on the first bush element 30).

Of course, the different hollow-pin element and friction element variants described in connection with FIGS. 4 and 8 are not limited to the respective embodiment of the interface position. Thus, a torque hinge with the interface between the hollow-pin element and the first bush element can also be designed with an alternative friction element (friction disk and bearing ring as in FIG. 8 or another friction element from the prior art). Conversely, a torque hinge can also be designed with the interface between the first bush element and a connection device having a hollow-pin element fixed against rotation in a bush element, or the friction element 20 described in connection with FIG. 4 (or other friction element known in the art), or both.

Figure 14:
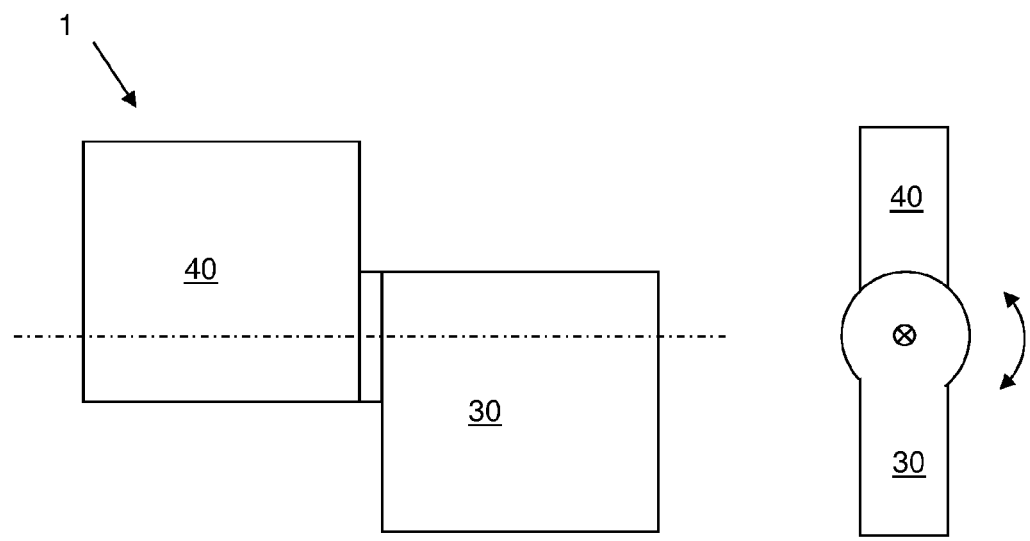
FIG. 14 is a schematic top and side view of a uniaxial pivoting torque hinge.
Figure 15:
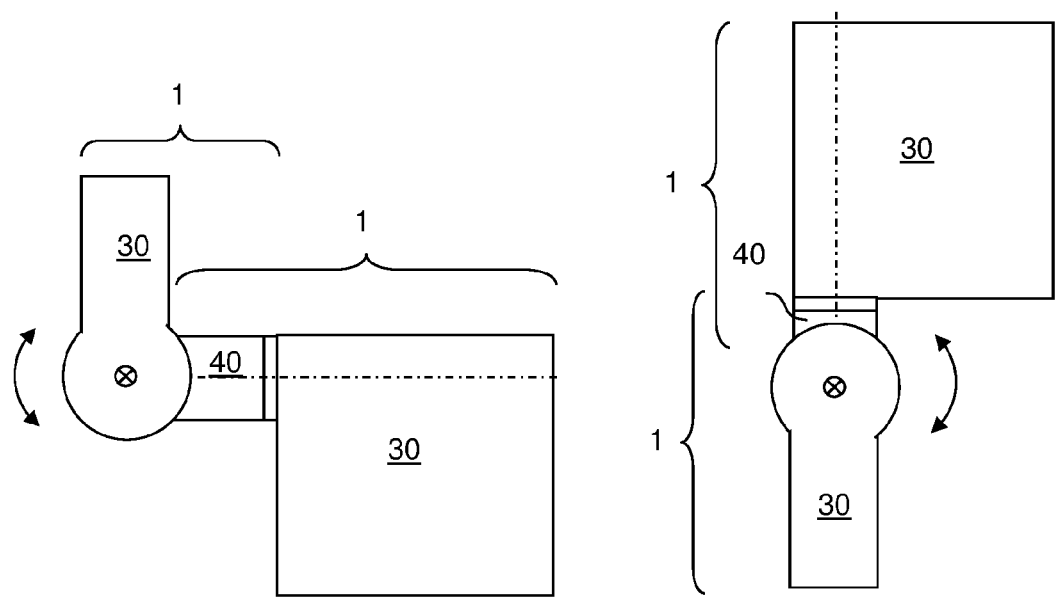
FIG. 15 is a schematic top and side view of a torque hinge that can be pivoted about two axes.

FIG. 14 illustrates the pivot axis provided by the torque hinge 1 through the schematic illustration of two bush elements 30, 40 connected (via a hollow-pin element not shown). The further development of a device indicated in FIG. 15 provides two pivot axes designed perpendicularly to one another, in that two torque hinges 1 are "connected in series," as it were, wherein only a second bush element 40 is provided, which is connected on both sides to a first bush element 30 in each case via a hollow-pin element. This can also be considered as a special form of a device comprising two objects G1, G2, which are pivotally and electrically/electronically connected via at least one torque hinge 1, wherein one of the first bush elements 30 is defined as one of the objects G1, G2.

LIST OF REFERENCE SIGNS

1 Torque hinge
2, 3, 2', 3' Connector elements, end faces
4, 4' (Interface) seal, molded seal
5, 5', 5" Bolt, spring pin, pair of magnets
6 Cover
7, 8 Disk spring(assembly), nut
9, 9' Connection device, connection bush
10 Hollow-pin element
11, 11' First section, detent recess
12, 12', 12" Second section, thread, groove
13, 13', 13" Stop, ring groove, rib
14, 14', 14" End face, receptacle recess, groove
15 Bore
16 Flattening
17 Head section
D1 Passage opening
20 Friction element
21, 22, 23 Friction ring, seal, disk
21', 23' Slide/bearing ring, friction disk
30 Second bush element
30', 30" Receptacles of first section of first connector element
31 Connection surface
31', 31" Receptacles of adapter, first connector element
32 Bore
33, 33' Opening, passage opening
34, 34' Receptacle groove
40 Second bush element
41 Connection surface
42 Connection element
43 Ring groove
44 Receptacle opening
B1, B2 First component group, second component group
T Interface
K, K' Cable guide
G1, G2 Object
D1, D2 Passage openings of hollow-pin element, first bush element
P, A Contact pin, contact connection
N, S Permanent magnet north pole, south pole H Proximity sensor
F1, F2 Shaping elements

The invention claimed is:

1. A torque hinge (1) for pivotally connecting a first object (G1) to a second object (G2), comprising:
a hollow-pin element (10);
a friction element (20);
at least one first bush element (30) designed for connection to the first object (G1);
at least one second bush element (40) designed for connection to the second object (G2);
an inner cable guide (K, K') that provides electrical and/or electronic connection of the objects (G1, G2); and
at least two component groups (B1, B2) that are disconnectable and connectable at an interface (T), of which a first component group (B1) is allocated to the first object (G1) and a second component group (B2) is allocated to the second object (G2),
wherein the inner cable guide (K, K') has at least one disconnectable and connectable electrical and/or electronic connector element pair at the interface (T), comprising two connector elements (2,3), including
a first connector element (3) allocated to the first component group (B1) and
a second connector element (2) corresponding to the first connector element (3) and allocated to the second component group (B2),
wherein the hollow-pin element (10) has
a first section (11), which is arranged in the first bush element (30), and
a second section (12), which extends into the second bush element (40) and on which the friction element (20) is arranged in a region between the first and second bush elements (30, 40), and
wherein the hollow-pin element (10)
is connected, at the first section (11), in a rotationally fixed manner to the first bush element (30) and is pivotally received, at the second section (12) of the hollow-pin element (10), in the second bush element (40),
or is designed as a free-running pin, which is pivotally received with the first section (11) in the first bush element (30) and with the second section (12) in the second bush element (40), and
wherein the inner cable guide (K, K') extends through a longitudinally axial passage opening (D1) of the hollow-pin element (10),
wherein the interface (T) is provided between the hollow-pin element (10) and the first bush element (30),
wherein the rotationally fixed connection of the hollow-pin element (10) to the first bush element (30) is a releasable rotationally fixed connection,
wherein the first component group (B1) includes at least the first bush element (30) and the first connector element (3), and
wherein the second component group (B2) includes at least the second bush element (40), the hollow-pin element (10) and the friction element (20).

2. The torque hinge (1) according to claim 1,
wherein the torque hinge (1) has a connection device (9) that is designed for electrical and/or electronic connection to the first object (G1) and a connection element (42) designed for electrical and/or electronic connection to the second object (G2),
wherein the connection device (9) is arranged in the first bush element (30) and is connected to the first connector element (3), and
wherein the connection element (42) is arranged in the second bush element (40) and is connected to the second connector element (2).

3. The torque hinge (1) according to claim 1,
wherein one of the two connector elements (2, 3) has, on an end face (2', 3') turned towards the other connector element (2, 3), a number of contact pins (P) that corresponds at least to the number of individual lines of the cable guide (K, K'), and the other connector element (2, 3) has an accordingly corresponding number of contact sections (A) on its end face (2', 3') turned towards the connector element (2, 3), and
wherein both connector elements (3, 2) have an identical non-circular, and non-rotationally symmetrical, cross-section.

4. The torque hinge (1) according to claim 1,
wherein one of the two connector elements (2, 3) has, on an end face (2', 3') turned towards the other connector element (2, 3), a number of contact pins (P) that corresponds at least to the number of individual lines of the cable guide (K, K'), and the other connector element (2, 3) has an accordingly corresponding number of contact sections (A) on its end face (2', 3') turned towards the connector element (2, 3), and
wherein each connector element (3, 2) has at least two permanent magnets (N, S) with a predetermined arrangement of north and south poles on the end face (3', 2').

5. The torque hinge (1) according to claim 1,
wherein one of the two connector elements (2, 3) has, on an end face (2', 3') turned towards the other connector element (2, 3), a number of contact pins (P) that corresponds at least to the number of individual lines of the cable guide (K, K'), and the other connector element (2, 3) has an accordingly corresponding number of contact sections (A) on its end face (2', 3') turned towards the connector element (2, 3), and
wherein the connector elements (2, 3) have additional control contact pins ($P_{Steuer}$) and control contact sections ($A_{Steuer}$), an arrangement of which on the respective end face (2', 3') is predetermined with respect to the contact pins (P1) and contact sections (A) allocated to the individual lines, wherein control lines, which are allocated to the control contact pins ($P_{Steuer}$) and control contact sections ($A_{Steuer}$), are connected to a disconnect device for the individual lines.

6. The torque hinge (1) according to claim 5,
wherein the control contact pins ($P_{Steuer}$) and the control contact sections ($A_{Steuer}$) differ in shape from a shape of the contact pins (P) and contact sections (A), or
wherein the first connector element (3) has shaping elements (F1', F2') on the end face (3') and the second connector element (2) has mating shaping elements (F1, F2) on the end face (2'), wherein the shaping elements (F1', F2') and mating shaping elements (F1, F2) are designed to correspond to one another in terms of dimensions and position on the end faces (2', 3').

7. The torque hinge (1) according to claim 6,
wherein the control contact pins ($P_{Steuer}$) and control contact sections ($A_{Steuer}$) are designed as lagging contacts with respect to the contact pins (P) and contact sections (A).

8. The torque hinge (1) according to claim 1,
wherein one of the two connector elements (2, 3) has, on an end face (2', 3') turned towards the other connector element (2, 3), a number of contact pins (P) that corresponds at least to the number of individual lines of the cable guide (K, K'), and the other connector element (2, 3) has an accordingly corresponding number of contact sections (A) on its end face (2', 3') turned towards the connector element (2, 3), and wherein at least one of the two connector elements (2, 3) has a proximity sensor (H), which is connected via control lines to a disconnect device for the individual lines.

9. The torque hinge (1) according to claim 1, wherein the torque hinge (1) has at least one seal (4), which is allocated to the first or the second component group (B1, B2) at the interface (T).

10. The torque hinge (1) according to claim 1, wherein the hollow-pin element (10) is connected, at the first section (11), in a rotationally fixed connection to the first bush element (30) and is pivotally received, at the second section (12) of the hollow-pin element (10), in the second bush element (40), wherein the interface (T) is provided between the hollow-pin element (10) and the first bush element (30), wherein the rotationally fixed connection of the hollow-pin element (10) to the first bush element (30) is a releasable rotationally fixed connection, wherein the first component group (B1) includes at least the first bush element (30) and the first connector element (3), and wherein the second component group (B2) includes at least the second bush element (40), the hollow-pin element (10) and the friction element (20).

11. The torque hinge (1) according to claim 1, wherein the releasable rotationally fixed connection of the hollow-pin element (10) to the first bush element (30), which has a receptacle (30') for the first section (11) of the hollow-pin element (10), is provided by a positive-locking and/or force-fitting and/or magnetic connection technology.

12. The torque hinge (1) according to claim 11, wherein the first section (11) of the hollow-pin element (10) has a non-circular and non-rotationally symmetrical, cross-section and the receptacle (30') for the first section (11) of the hollow-pin element (10) in the first bush element (30) has a correspondingly shaped non-circular and non -rotationally symmetrical, cross-section, and/or wherein the first section (11) of the hollow-pin element (10) and the first bush element (30) have aligned bores (15, 32) in which a bolt (5) is arranged, and/or wherein the first section (11) of the hollow-pin element (10) has a detent recess (11') for engaging a spring-mounted bolt (5'), which is mounted in a position corresponding to the detent recess (11') in the receptacle (30') of the first bush element (30), and/or wherein a first magnetic element (5') is arranged on a surface of a stop (13) adjacent to the first section (11) and a second magnetic element (5') is arranged on a corresponding surface on the first bush element (30) adjacent to the receptacle (30'), wherein the first and second magnetic elements (5') are selected and arranged from magnetic and magnetizable materials such that an attractive force is provided between the first and second magnetic elements (5').

13. The torque hinge (1) according to claim 1, wherein the second connector element (2) is arranged in a receptacle recess (14') that is formed by a section of the passage opening (D1) at an end face (14) of the first section (11) of the hollow-pin element (10) and that corresponds in shape and dimension to the second connector element (2), and wherein the first bush element (30) has a receptacle (30") for the first connector element (3) corresponding in shape and dimension to the first connector element (3) and positioned opposite the receptacle recess (14') on the end face (14) of the first section (11) of the hollow-pin element (10).

14. The torque hinge (1) according to claim 12, wherein the receptacle recess (14') in the hollow-pin element (10) for the second connector element (2) and the receptacle recess (30") in the first bush element (30) for the first connector element (3) have a cross-section that is shaped in a manner corresponding to the cross-section of the respective first and second connector elements (3, 2).

15. A device, comprising
a first object (G1);
a second object (G2); and
a torque hinge (1) pivotally connecting the first object (G1) to the second object (G2), the torque hinge (1) comprising:
a hollow-pin element (10);
a friction element (20);
at least one first bush element (30) connected to the first object (G1);
at least one second bush element (40) connected to the second object (G2);
an inner cable guide (K, K') that provides electrical and/or electronic connection of the first object (G1) and the second object (G2); and
at least two component groups (B1, B2) that are disconnectable and connectable at an interface (T), of which a first component group (B1) is coupled to the first object (G1) and a second component group (B2) is coupled to the second object (G2),
wherein the inner cable guide (K, K') has at least one disconnectable and connectable electrical and/or electronic connector element pair at the interface (T), comprising two connector elements (2,3), including
a first connector element (3) coupled to the first component group (B1) and
a second connector element (2) corresponding to the first connector element (3) and coupled to the second component group (B2),
wherein the hollow-pin element (10) has
a first section (11), which is arranged in the first bush element (30), and
a second section (12), which extends into the second bush element (40) and on which the friction element (20) is arranged in a region between the first and second bush elements (30, 40), and
wherein the hollow-pin element (10)
is connected, at the first section (11), in a rotationally fixed manner to the first bush element (30) and is pivotally received, at the second section (12) of the hollow-pin element (10), in the second bush element (40),
or is designed as a free-running pin, which is pivotally received with the first section (11) in the first bush element (30) and with the second section (12) in the second bush element (40), and
wherein the inner cable guide (K, K') extends through a longitudinally axial passage opening (D1) of the hollow-pin element (10), wherein the interface (T) is provided between the hollow-pin element (10) and the first bush element (30), wherein the rotationally fixed connection of the hollow-pin element (10) to the first bush element (30) is a releasable rotationally fixed connection, wherein the first component group (B1) includes at least the first bush element (30) and the first connector element (3), and wherein the second component group (B2) includes at least the second bush element (40), the hollow-pin element (10) and the friction element (20).

* * * * *